United States Patent [19]

Boyd et al.

[11] Patent Number: 4,601,543

[45] Date of Patent: Jul. 22, 1986

[54] NEMATIC LIQUID CRYSTAL STORAGE DISPLAY DEVICE

[75] Inventors: Gary D. Boyd, Rumson; Julian Cheng, Little Silver, both of N.J.; Robert B. Meyer, Wellesley, Mass.; Robert N. Thurston, Colts Neck, N.J.

[73] Assignee: AT&T Bell Laboratories, Murray Hill, N.J.

[21] Appl. No.: 788,108

[22] Filed: Oct. 17, 1985

Related U.S. Application Data

[63] Continuation of Ser. No. 434,524, Oct. 15, 1982, abandoned.

[51] Int. Cl.$^4$ .............................................. G02F 1/13
[52] U.S. Cl. ............................... 350/334; 350/331 R; 350/341
[58] Field of Search ................... 350/330, 331 R, 334, 350/341, 346

[56] References Cited

U.S. PATENT DOCUMENTS

| | | | |
|---|---|---|---|
| 4,214,819 | 7/1980 | Pohl et al. | 350/330 X |
| 4,333,708 | 6/1982 | Boyd et al. | 350/334 X |
| 4,400,060 | 8/1983 | Cheng | 350/341 X |

OTHER PUBLICATIONS

Meyer, Robt. B., "Distortion of a Cholesteric Structure by a Magnetic Field," *Applied Physics Lett.*, vol. 14, No. 7 (Apr. 1969), pp. 208–209.

DeGennes, P. G., *The Physics of Liquid Crystals*, (Clarendon Press, Oxford), pp. 188–191.

J. Appl. Phys. 53(6), Jun. 1982, "Optical Properties of a New Bistable Twisted Nematic Liquid Crystal Boundary Layer Display" by R. N. Thurston, Julian Cheng and G. D. Boyd, pp. 4463–4479.

Appl. Phys. Lett. 40(12), Jun. 15, 1982, "A Nematic Liquid Crystal Storage Display Based on Bistable Boundary Layer Configurations" by J. Cheng, R. N. Thurston and G. D. Boyd, pp. 1007–1009.

J. Appl. Phys. 52(4), Apr. 1981, "Boundary-Layer Model of Field Effects in a Bistable Liquid-Crystal Geometry" by Julian Cheng and R. N. Thurston, pp. 2756–2765.

*Primary Examiner*—John K. Corbin
*Assistant Examiner*—Richard F. Gallivan
*Attorney, Agent, or Firm*—Peter A. Businger

[57] ABSTRACT

A bistable nematic liquid crystal display cell is switched between topologically equivalent, asymmetric horizontal states. Switching is initiated by application of a directional, symmetry breaking field such as a transverse magnetic field. An electric potential is then applied across the cell to complete the switching cycle and maintain the state. The cell includes upper and lower parallel substrates, upper and lower topographically textured tilt alignment surfaces on the corresponding substrates, and nematic liquid crystal material between the substrates. In an active region of the cell, the tilt alignment surfaces form an equal reverse tilt boundary condition. In an isolation region surrounding the active region of the cell, the tilt alignment surfaces form a parallel tilt boundary condition.

6 Claims, 11 Drawing Figures

NEMATIC LIQUID CRYSTAL STORAGE DISPLAY DEVICE

This application is a continuation of application Ser. No. 434,524 filed Oct. 15, 1982, abandoned.

CROSS-REFERENCE TO RELATED APPLICATIONS

U.S. patent application entitled "A Nematic Liquid Crystal Storage Display Device", Ser. No. 434,522, now abandoned, was filed in the U.S. Patent and Trademark Office concurrently herewith, and U.S. patent application Ser. No. 788,673 was filed on Oct. 17, 1985 as a continuation application.

Also, U.S. patent application entitled "A Nematic Liquid Crystal Storage Display Device", Ser. No. 434,618, now abandoned, was filed in the U.S. Patent and Trademark Office concurrently herewith, and U.S. patent application Ser. No. 788,107 was filed on Oct. 17, 1985 as a continuation application.

TECHNICAL FIELD

This invention relates to display devices and, more particularly, to bistable liquid crystal devices.

BACKGROUND OF THE INVENTION

Bistable nematic liquid crystal display devices generally require large electric potentials to initiate interstate switching between bistable states. One important reason for such large electric switching potentials is that sufficient electric energy must be supplied to each display cell for detaching and moving disclinations from pinning sites.

One embodiment of a nematic liquid crystal display device exhibits configurational bistability between two dissimilar states. See U.S. Pat. No. 4,333,708 issued to G. D. Boyd et al. on June 8, 1982. The two states, which exist separately in the absence of a holding potential, are topologically inequivalent and derive stability from disclination pinning. Interstate switching is accomplished by detaching and moving disclinations from a pinning site in response to an applied switching potential which exceeds a large, sharp switching threshold.

Reduction of the switching threshold level for this type of liquid crystal display device is achieved by prebiasing selected cells in the display with a small priming potential prior to applying the larger switching potential. See, for example, copending U.S. patent application, Ser. No. 411,305, filed Aug. 25, 1982. Although the switching threshold level is lower for the latter nematic liquid crystal display device, the switching level remains sufficiently high, for example, on the order of one hundred volts, to ensure detachment and motion of the disclinations necessary to achieve interstate switching.

In both of the above display devices, the problems of relatively large switching potentials and switching by disclination motion still exist.

SUMMARY OF THE INVENTION

Interstate switching between two topologically equivalent horizontal states in a bistable nematic liquid crystal display cell is achieved without any disclination motion by sequential application of both a symmetry breaking, directional field to initiate switching and a small electric holding potential to complete the switching. The cell comprises upper and lower substrates, nematic liquid crystal material disposed between both substrates and a combination of elements integrally connected to the substrates capable of preferentially orienting directors of the liquid crystal material into a first horizontal state having an inversion layer substantially adjacent and parallel to a predetermined substrate in the presence of an external, symmetry breaking, directional field followed in sequence by a particular applied electric potential.

In one embodiment of the invention, the liquid crystal display cell comprises upper and lower parallel substrates having electrically conductive strips and topographically textured tilt alignment surfaces disposed thereon, a nematic liquid crystal material disposed between opposing textured surfaces, a source for the external directional field, and a source of variable potential connected to the conductive strips for generating electric switching fields through the liquid crystal material. A cell is divided into an active region and an isolation region which surrounds the active region. In the active region of the cell, the opposing textured tilt alignment surfaces exhibit an equal reverse tilt boundary condition and a twist or angular difference between azimuthal orientations of the opposing textured tilt alignment surfaces for optical differentiation of the states. On each textured tilt alignment surface, the isolation region is characterized by a parallel boundary condition. Interstate switching is performed by applying a first external directional field of sufficient field strength to the liquid crystal material to initiate alignment of the orientational directors in a first asymmetric horizontal state. A small AC holding potential greater than a critical potential is applied normal to the substrates to complete switching to the first state. Transitions to the second state are accomplished by applying a second external directional field to the liquid crystal material in order to initiate proper alignment of the orientational directors in a second asymmetric horizontal state. Again, the small AC holding potential is applied to complete switching to the second state.

BRIEF DESCRIPTION OF THE DRAWING

A more complete understanding of the invention may be obtained by reading the following description of a specific illustrative embodiment of the invention in conjunction with the appended drawings in which.

DETAILED DESCRIPTION

A new bistability effect is shown for nematic liquid crystals wherein interstate switching between two topologically equivalent states is initiated by application of a symmetry breaking, directional field. A state is maintained in its proper configuration by subsequent application of a small holding potential. Each state exhibits a boundary inversion layer containing substantially horizontally aligned orientational directors adjacent to a corresponding boundary. Switching from one state to another requires no disclination motion because of the topological equivalence of the states.

Figure 1:
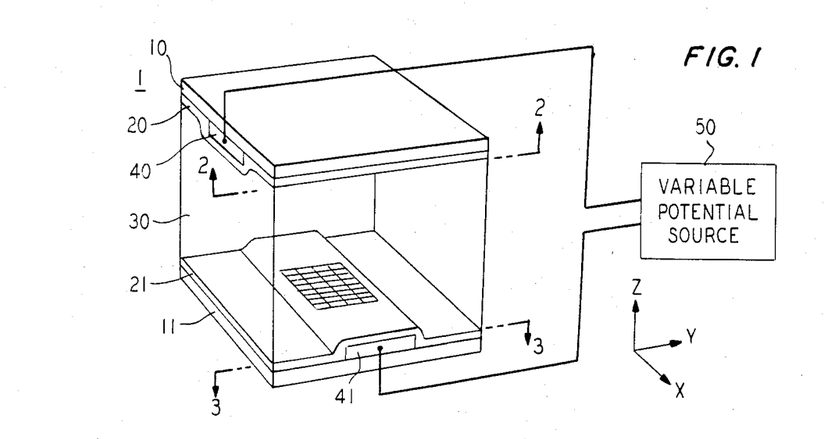
FIG. 1 shows a three-dimensional view of a liquid crystal display cell.

A liquid crystal display cell is shown in FIG. 1. Liquid crystal display cell 1 is only one of a plurality of such cells which are included in an entire liquid crystal display. As shown in FIG. 1, cell 1 includes upper substrate 10, lower substrate 11, upper topographically textured tilt alignment surface 20, lower topographically textured tilt alignment surface 21, nematic liquid crystal material 30, upper conductor 40, and lower conductor 41. Holding potentials are supplied to the cell from variable potential source 50 connected to upper conductor 40 and lower conductor 41. A set of reference basis vectors (x,y,z) is shown in the Figures to assist in orienting cell 1 in FIG. 1 with respect to FIGS. 4 through 11.

Substrates 10 and 11 support conductors 40 and 41, respectively, as well as provide a means for containing liquid crystal material 30. Each substrate is composed primarily of a transparent dielectric material such as silicon dioxide or glass or the like.

Conductors 40 and 41 are disposed on an inner opposing surface of each respective substrate in order to permit an electric field to be imposed substantially perpendicular to each substrate. Both interdigital electrodes and continuous uniform strip electrodes are arrangements suitable for use as conductors 40 and 41.

As shown in FIG. 1 for illustrative purposes only, conductors 40 and 41 are continuous uniform strip electrodes orthogonally disposed with respect to each other. Conductor 40 is formed on an inner surface of upper substrate 10, while conductor 41 is similarly formed on an inner surface of lower substrate 11 in a direction orthogonal to the direction of conductor 40. Each conductor is deposited or etched by conventional photolithographic techniques as a thin film on the inner surface of the respective substrate. Transparent films such as indium tin oxide are used as conductors on both substrates of transmission mode display cells, whereas opaque films comprised of aluminum, for example, are used for conductors on one substrate in reflection mode display cells.

Topographically textured tilt alignment surfaces 20 and 21 are utilized to induce a known tilt alignment on the liquid crystal molecules adjacent to each surface. These surfaces have also been called tilt alignment surfaces. Surfaces 20 and 21 are transparent non-conducting layers on the exposed inner surfaces of the substrates and conductors for defining surface alignment of the orientational directors of liquid crystal material 30. Surfaces 20 and 21 are integrally connected to each respective substrate by oblique electron beam deposition or thermal evaporation of a material such as a titanium oxide or silicon oxide, each of which act as insulators. This results in a uniformly tilted columnar topography for each tilt alignment surface. The topography on each of surfaces 20 and 21 defines a surface tilt angle $\theta_0$ measured from each substrate normal (inner surface) in the range 0 degrees to 90 degrees. Surface tilt angles greater than 45 degrees are preferred in order to ensure dominance of the horizontal orientational director configuration. Tilt alignment surfaces 20 and 21 are more completely described below in reference to FIGS. 2 and 3.

Liquid crystal material 30 is a liquid crystal substance in the nematic mesophase having positive dielectric anisotropy at least in some predetermined frequency range. In an exemplary display cell, material 30 is comprised of cyanobiphenyl samples of E7 from Merck Chemical Company. Liquid crystal material 30 is disposed between opposite, parallel substrates wherein the surface to surface separation of the substrates is less than 20 μm and, typically, is about 10 μm.

Display cell 1 is partitioned into an active region and an inactive region. The active region includes a volume of liquid crystal material 30 which is capable of interstate switching in response to appropriately applied fields. In general, for a cell of the type shown in FIG. 1, the active region is defined as that region between the overlap of conductors 40 and 41. In FIG. 1, a lower boundary of the active region is shown as the crosshatched area on surface 21.

The inactive region surrounding each active region is a volume of liquid crystal material which maintains a fixed orientational director configuration regardless of the configurations in adjacent active regions. Each inactive region, also known as a neutral isolation region, separates, isolates and stabilizes the surrounded active region of a corresponding cell in the liquid crystal display. A theory of neutral isolation regions is explained by J. Cheng in "Surface Pinning of Disclinations and the Stability of Bistable Nematic Storage Displays," J. Appl. Phys. 52, pp. 724–727 (1981). Also, in this regard, the material contained in U.S. patent application, Ser. No. 252,148, filed Apr. 8, 1981, by J. Cheng (now U.S. Pat. No. 4,400,060, issued Aug. 23, 1983) is expressly incorporated herein.

Additional information concerning physical aspects and construction of the basic display cell shown in FIG. 1 is contained in both U.S. Pat. No. 4,333,708 issued to G. D. Boyd et al. on June 8, 1982 and U.S. patent application, Ser. No. 375,670 filed May 6, 1982 (now U.S. Pat. No. 4,472,026, issued Sept. 18, 1984). In this regard, pertinent material from each of the aboveidentified references is expressly incorporated herein by reference.

Variable potential source 50 generates an electrical signal which is supplied to upper conductor 40 and lower conductor 41 to impose an AC electric field through liquid crystal material 30 substantially normal to substrates 10 and 11. Subsequent to initiation of interstate switching, a holding electric field is imposed in the active region of the display cell to complete switching and to maintain the orientational director configuration of liquid crystal material 30 in either an upper asymmetric horizontal state (FIG. 6) or a lower asymmetric horizontal state (FIG. 7).

Signals generated by source 50 are generally from the family of constant envelope signals and, more particularly, of substantially constant envelope, gated, AC pulse signals. Constant envelope AC signals are preferred to constant amplitude or DC signals because the latter signals give rise to space charge polarization effects which reduce the amplitude of the applied electric field.

In order to complete switching in accordance with the principles of this invention, holding signals from source 50 generate potentials referenced to a critical potential $V_c$, which is described in more detail below. The holding signal is generated by source 50 to maintain the orientational directors in the particular asymmetric horizontal state to which they have been switched. The holding signal creates a potential of magnitude $V_H$ across the cell, wherein $V_H$ is at least greater than the critical potential $V_c$. Holding potential magnitude $V_H$ can be increased to improve optical contrast between the first and second asymmetric horizontal states. It should be noted that the potentials $V_H$ and $V_c$ depend upon the dimensions and other characteristics of the liquid crystal display cell. However, by way of example, it is known that, for a thin cell (10 μm intersubstrate separation) containing E7, the potentials are $V_c$ equal to 1.5 volts and $V_H$ is less than 10.0 volts. More detailed information concerning variable potential source 50 and bistable switching of liquid crystal display cell 1 is given below with respect to FIGS. 5 through 11.

Figure 2:
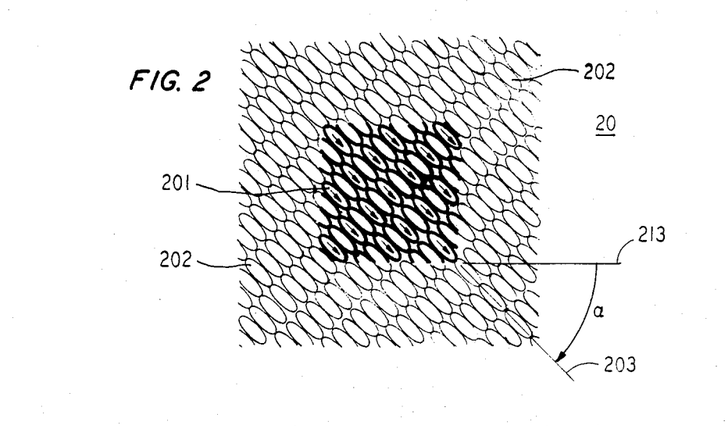
FIG. 2 shows a conceptual rendering of upper topographically textured tilt alignment surface 20 as viewed from line 2—2 in FIG. 1.

FIG. 2 shows a view of upper tilt alignment surface 20 from a position along line 2—2 in FIG. 1. Tilt alignment surface 20 includes active region surface 201 (dark outlined ellipses) and isolation region surface 202 (light outlined ellipses). Ellipses have been drawn to represent tilted columns in the tilted topography of surface 20. Along the major axis of each of several ellipses on active region surface 201, a vector has been drawn as an orthogonal projection of the major axis of each ellipse, i.e., the molecular axis of a column, onto the tilt alignment surface. Since the vector indicates a direction in which the columns point away from the tilt alignment surfaces, it can be said that the vector indicates a direction of surface tilt for the columns and, hence, a direction of azimuthal bias for the tilt alignment surface.

Azimuthal bias for an active region surface is measured as an angular displacement from a reference line. In the Figures, line 213 is the reference line. Line 203 is parallel with the vectors of surface 201 to indicate the direction of azimuthal bias for active region surface 201 at angle α, where α is an acute angle between −90 degrees and +90 degrees. It should be noted that isolation region surface 202 is aligned parallel with the direction of azimuthal bias of active region surface 201.

Figure 3:
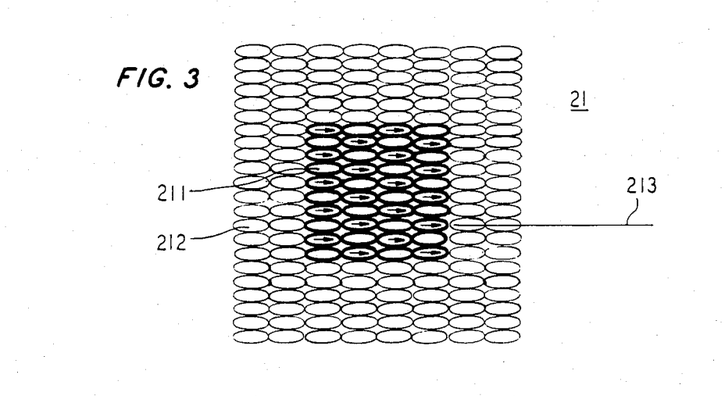
FIG. 3 shows a conceptual rendering of lower topographically textured tilt alignment surface 21 as viewed from line 3—3 in FIG. 1.

FIG. 3 shows a view of lower tilt alignment surface 21 from a position along line 3—3 in FIG. 1. Surface 21 includes active region surface 211 (dark outlined ellipses) and isolation region surface 212 (light outlined ellipses). Reference line 213 also shows the direction of azimuthal bias for active region surface 211 so that the azimuthal bias for surface 211 is zero degrees. The azimuthal bias for surface 212 is parallel with the direction of bias for surface 211.

In the active region of the display cell, surfaces 20 and 21 form a reverse tilt boundary condition. Reverse tilt occurs because the azimuthal bias α of surface 201 is between −90 degrees and +90 degrees and, when measured as an acute angle from each respective substrate normal (inner surface) the surface tilt angle for surface 201 has an opposite polarity to the surface tilt angle for surface 211. For example, as shown in FIGS. 2 and 3, the surface tilt angle for surface 201 is measured counterclockwise from the inner surface normal of substrate 10 as an acute angle, whereas the tilt angle for surface 211 is measured clockwise from the inner surface normal of substrate 11. As stated above, the surface tilt angles for surfaces 201 and 211 are required to have absolute values in the range 0 degrees to 90 degrees from the respective substrate normals and, more preferably, greater than 45 degrees to favor a horizontal orientational director configuration. Furthermore, it is important to the principles of the invention that the reverse tilt be substantially equal so that the absolute-valued tilt angle of surface 201 is substantially equal to the absolute-valued tilt angle for surface 211.

In the isolation region, surfaces 20 and 21 form a uniformly parallel boundary condition aligned parallel with the azimuthal bias of the corresponding active region surfaces. That is, isolation region surfaces 202 and 212 have columns exhibiting surface tilt angles of approximately 90 degrees from the substrate normal (see FIGS. 2 and 3). It has been found that, for ease in fabrication, the parallel boundary condition of surfaces 201 and 202 be made by oblique evaporation of $SiO_x$ with the plane of incidence perpendicular to the preferred azimuthal bias direction from an angle of approximately 65 degrees from the substrate normal.

Upper and lower tilt alignment surfaces are important, individually and in combination, to interstate switching of the liquid crystal display cell. Upper and lower tilt alignment surfaces are fabricated to provide substantial symmetry in the display cell and optical differentiation of the asymmetric states. Particularly, the difference between the azimuthal biases of the upper and lower active region surfaces provides optical differentiation between the states. Symmetry of the surfaces in the display cell eliminates a preference for establishment of an asymmetric horizontal state near a particular surface in the absence of the symmetry breaking field. These features will become more apparent with reference to the description of FIGS. 4 through 7 below.

Figure 4:
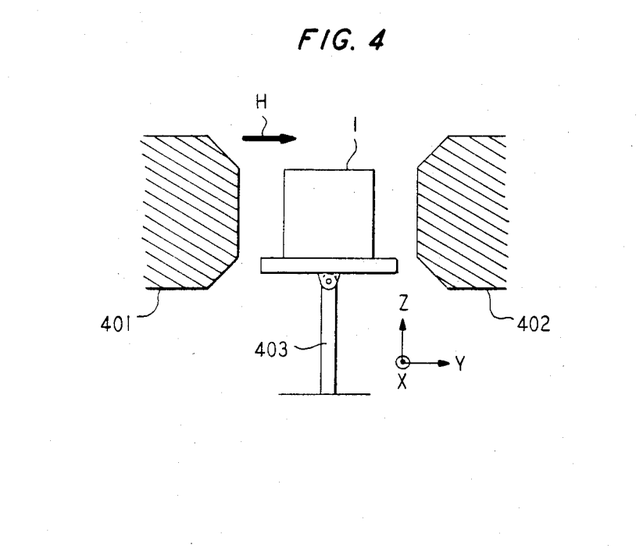
FIG. 4 shows the display cell of FIG. 1 situated on a rotatable platform in an external directional magnetic field in accordance with an aspect of the invention.

FIG. 4 shows liquid crystal display cell 1 being subjected to one exemplary type of external, directional, symmetry breaking field, namely, a uniform static magnetic field. Magnetic elements 401 and 402 generate a magnetic field whose direction is indicated by vector H. Cell 1 is situated on platform 403 having several degrees of freedom to allow, at least, rotation and tilt of display cell 1 so that the magnetic field can be applied transverse to the cell. The magnetic field generated between magnetic elements 401 and 402 is required to be of sufficient strength to initiate interstate switching by reorienting the liquid crystal molecules (orientational directors) in time τ. For example, in a 10 μm (intersubstrate thickness) sample of E7, a transverse magnetic field of less than 10k Gauss in strength and 0.2 sec. duration is capable of causing sufficient molecular reorientation to initiate interstate switching.

Figure 5:
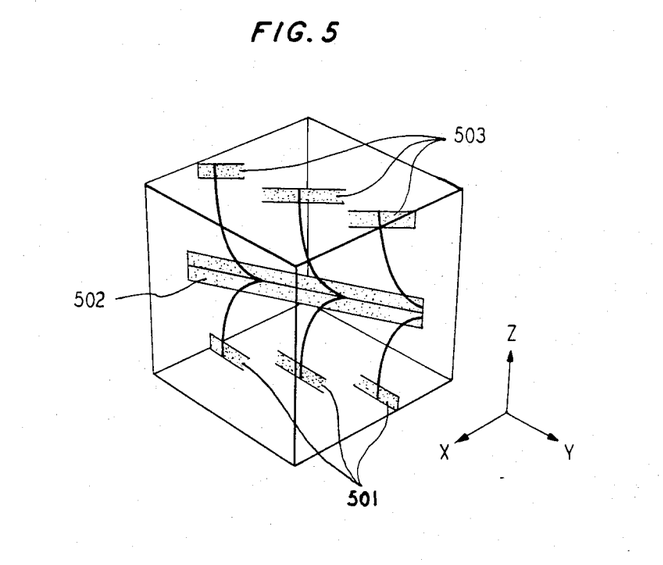
FIGS. 5 through 7 illustrate various horizontal orientational director alignments within the active region in the display cell of FIG. 1 in accordance with the principles of the invention.

FIG. 5 shows a three-dimensional view of the volume of liquid crystal material in the active region of the display cell depicted with the orientational directors in an undistorted horizontal configuration. This is the quiescent configuration of the cell because the orientational directors of the liquid crystal material assume this configuration in the absence of an external field. Planar sections 501 of a boundary layer contain directors of the liquid crystal material oriented substantially at the surface tilt angle of surface 211, while planar sections 503 of another boundary layer contain directors oriented at the surface tilt angle of surface 201. Planar section 502 of an inversion layer contains orientational directors which are horizontal or substantially parallel to each substrate surface.

For simplicity, FIG. 5 shows only enough detail to see planar section 502 as a single section of coplanar orientation directors in the inversion layer. Clearly, there are a plurality of identical planar sections parallel to planar section 502 which comprise the entire inversion layer. Similarly, there are corresponding pluralities of identical planar sections parallel to each of planar sections 501 and 503 which comprise boundary layers at surfaces 20 and 21, respectively. This simplication of detail has been applied to FIGS. 6 and 7.

Orientational director alignment is not changed from the undistorted horizontal configuration until a directional, symmetry breaking field is applied to the cell. Furthermore, this change is maintainable by subsequent application of a holding potential equal to or greater than the critical potential. Critical potential $V_c$ is defined as the potential above which liquid crystal material 30 behaves in a bistable manner with respect to horizontal configurations. The critical potential is described as follows. Assume that all boundary and inversion layers are completely separated and exhibit uniform splay bend distortion energy $U_o$ per unit volume where $$U_o = \frac{\bar{k}}{2}\left[\frac{\pi}{2\xi}\right]^2, \text{ and}$$

$$\xi = \frac{1}{E}\left[\frac{4\pi\bar{k}}{\Delta\epsilon}\right]^{\frac{1}{2}}$$

where $\xi$ is the electric coherence length defined as the characteristic distance in which liquid crystal molecules with mean splay bend modulus $\bar{k}$ and dielectric anisotropy $\Delta\epsilon$ rotate from perpendicular to parallel with respect to an applied electric field E. The energy density per unit area of each boundary layer is proportional to the thickness of the particular layer as shown in the table below:

| Layer Type (Reference Numerals) | Thickness | Energy Density Per Unit Area |
|---|---|---|
| Boundary (601, 701) | $\xi/2$ | $U_o\xi/2$ |
| Inversion (not shown) | $2\xi$ | $2 U_o\xi$ |
| Boundary Inversion (602, 702) | $\frac{3}{2}\xi$ | $\frac{3}{2} U_o\xi$ |

Figure 6:
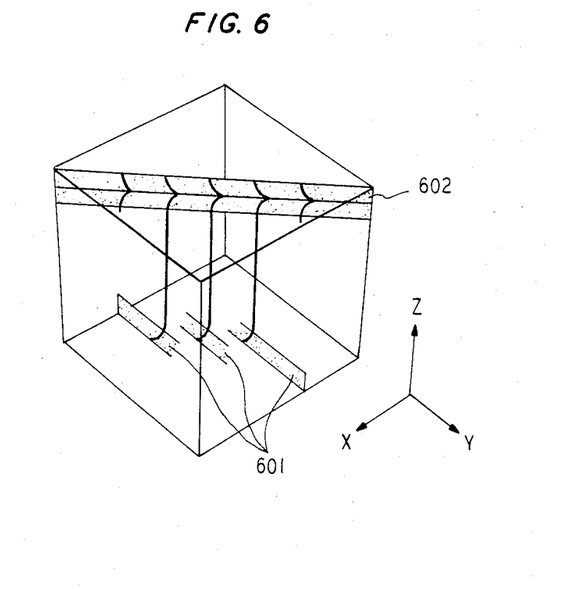
Figure 7:
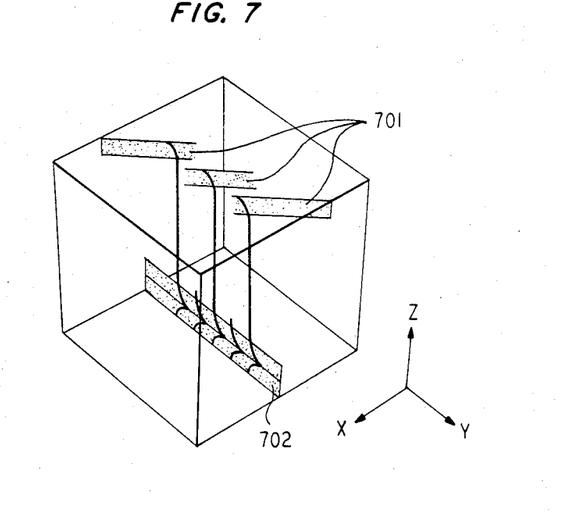

From the table above, it is clear that a distorted horizontal configuration having upper and lower boundary layers and a centrally located inversion layer has a total energy per unit area of $3U_o\xi$, whereas the asymmetric horizontal states of FIGS. 6 and 7 each have total energy per unit area of $2U_o\xi$. However, the argument presented is not valid for an applied field for which the boundary and inversion layers merge across the total thickness, d, of the display cell. Therefore, the cell thickness d is at least equal to $3\xi$ and the critical potential is given by the relation, $$V_c = dE_c = 3\xi E_c.$$

For a sample of cyanobiphenyl E7 and absolute-valued surface tilt angles of approximately 53 degrees, the critical potential $V_c$ is approximately 1.3 to 1.7 volts.

If the directional field applied to cell 1 in the undistorted horizontal configuration is sufficient to break the symmetry of the cell in favor of surface 20 and if the potential applied subsequent to the field is $V_H$ corresponding to the holding signal from source 50, the undistorted horizontal configuration (FIG. 5) is transformed into the upper asymmetric horizontal state shown in FIG. 6. The transformation occurs by upward vertical movement of an inversion layer toward an upper boundary layer. This results in the formation of boundary inversion layer 602 adjacent to active region surface 201 of surface 20. Orientational directors in boundary inversion layer 602 reside in the plane which includes both the substrate normal and the azimuthal bias line for active region surface 201, i.e., line 203. A lower boundary layer of orientational directors appears adjacent to active region surface 211, of surface 21. Holding potential $V_H$ is applied to the cell via the holding signal from source 50 to maintain the upper asymmetric horizontal state.

On the other hand, if the directional field applied to cell 1 in the undistorted horizontal configuration is sufficient to break the cell symmetry in favor of surface 21 and the holding signal from source 50 is subsequently applied to the cell the undistorted horizontal configuration is transformed into the lower asymmetric horizontal state shown in FIG. 7. Again, this transformation occurs by downward vertical movement of the inversion layer toward the lower boundary layer. This results in the formation of boundary inversion layer 702 adjacent to active region surface 211 of surface 21. Orientational directors of boundary inversion layer 702 reside in a plane which includes both the substrate normal and the azimuthal bias line for active region surface 211, i.e., line 213. An upper boundary layer of orientational directors appears adjacent to active region surface 201 of surface 20. Holding potential $V_H$ is applied to the cell via the holding signal from source 50 to maintain the lower asymmetric horizontal state.

Interstate switching between asymmetric horizontal states, for example, upper-to-lower or lower-to-upper, is accomplished by extinguishing the holding signal to the cell to allow liquid crystal material 30 to relax momentarily into a substantially undistorted horizontal configuration (FIG. 5). After a short relaxation period, the cell is subjected to the symmetry breaking directional field followed by the holding signal to carry out interstate switching appropriately.

Figure 8:
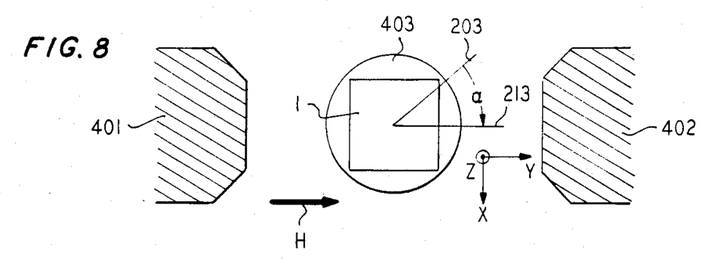
FIGS. 8 and 9 depict a first method for interstate switching in the display cell.
Figure 9:
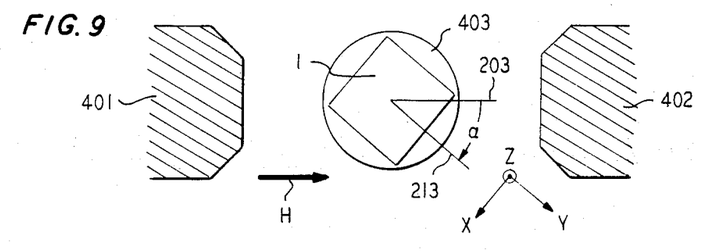
Figure 10:
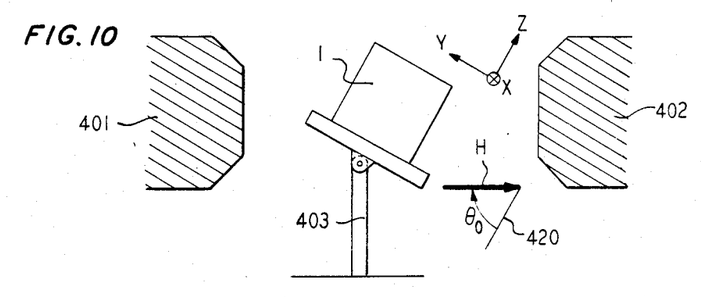
FIGS. 10 and 11 depict a second method for interstate switching in the display cell.
Figure 11:
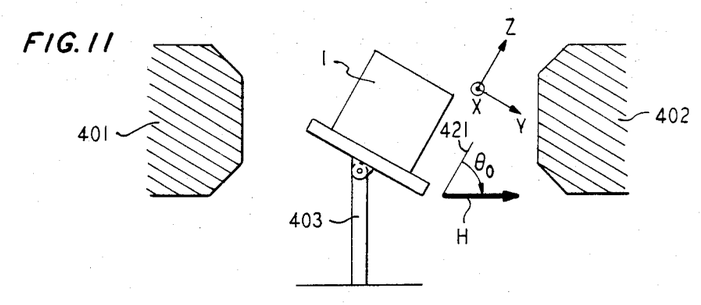

Two methods are shown in the Figures for performing interstate switching in liquid crystal display cell 1. The first method shown in FIGS. 8 and 9 is based upon rotation of the cell relative to a transverse field to achieve switching. The second method depicted in FIGS. 10 and 11 is based upon oblique orientation of the directional field through the display cell substantially at the surface tilt angle of a particular tilt alignment surface. Both methods employ magnetic fields to generate a symmetry breaking bias in the display cell to favor creation of one horizontal state over the other.

FIGS. 8 and 9 illustrate steps in one exemplary method for switching between asymmetric horizontal states in liquid crystal display cell 1. In FIG. 8, display cell 1 on platform 403 is situated between magnetic elements 401 and 402. Magnetic field H is directed transversely through display cell 1 substantially parallel with the azimuthal bias of surface 211 (line 213). In FIG. 9, platform 403 has been rotated clockwise through $\alpha$ degrees from the position in FIG. 8 in order to align magnetic field H substantially parallel with the azimuthal bias of surface 201 (line 203).

To describe the first switching method shown in FIGS. 8 and 9, it is assumed that the display cell is in the lower asymmetric horizontal state for the position shown in FIG. 8. Switching from lower to upper asymmetric horizontal states is performed by rotating the cell and platform from the position in FIG. 8 to the position in FIG. 9, that is, a clockwise rotation through $\alpha$ degrees, in the presence of only the magnetic field. Holding potential $V_H$ is extinguished to ensure dominance by the magnetic field. Magnetic field H is directed in such a way as to break the symmetry of display cell 1 in favor of the tilt alignment surface 20 and, thereby, initiate switching to the upper asymmetric state. After switching commences, the holding potential is re-established on liquid crystal display cell 1 by source 50 to complete the switching cycle and to maintain the orientational director configuration in the upper asymmetric horizontal state.

Switching from the upper asymmetric horizontal state to the lower asymmetric horizontal state is carried out by first extinguishing the holding potential to allow relaxation of the orientation directors to a substantially undistorted horizontal configuration. After a brief period of relaxation, the liquid crystal display cell is rotated via platform 403 to align magnetic field H substantially parallel with the azimuthal bias of surface 211 (line 213) as shown in FIG. 8. For example, this may be accomplished by a counterclockwise rotation of approximately $\alpha$ degrees from the position shown in FIG. 9. The rotation of the cell in the magnetic field breaks the symmetry of the cell in favor of tilt alignment surface 21 and, thereby, initiates switching to the lower asymmetric horizontal state. After switching has begun, the holding potential to display cell 1 is re-established to complete the switching cycle and to maintain the orientational director configuration in the lower asymmetric horizontal state.

The second exemplary method for switching between asymmetric horizontal states in display cell 1 is shown in FIGS. 10 and 11. In FIG. 10, display cell 1 on platform 403 is positioned between magnetic elements 401 and 402 to have magnetic field H directed obliquely through the cell substantially at $\theta_0$ degrees from inner surface normal 420 to tilt alignment surface 20, where $\theta_0$ is the surface tilt angle of active region surface 201. In FIG. 11, platform 403 has been rotated through 180 degrees (about the z-axis) from the position shown in FIG. 10 in order to reverse the direction of magnetic field H with respect to cell 1 while maintaining a similar oblique relationship between the magnetic field and the display cell. That is, magnetic field H is directed at approximately $\theta_0$ degrees from inner surface normal 421 to tilt alignment surface 21, where $\theta_0$ is the surface tilt angle of active region surface 211 on surface 21.

In order to describe the second method of switching shown in FIGS. 10 and 11, it is assumed that the display cell is in the lower asymmetric horizontal state for the position shown in FIG. 10. Switching from lower to upper asymmetric horizontal states is initiated in the absence of a holding potential by changing the oblique orientation of the magnetic field to be substantially at the surface tilt angle of active region surface 211 on lower surface 21. Simply, the holding potential is extinguished, platform 403 is rotated through 180 degrees from the position shown in FIG. 10 and then platform 403 is tilted clockwise by $\theta_0$ degrees relative to inner surface normal 421 as shown in FIG. 11. The holding potential is re-established to complete the switching and to maintain the orientational director configuration in the upper asymmetric horizontal state.

In order to initiate switching from the upper asymmetric horizontal state to the lower asymmetric horizonal state, the holding potential is extinguished and platform 403 is rotated through 180 degrees from the position shown in FIG. 11 and then tilted clockwise by $\theta_0$ degrees relative to inner surface normal 420 as shown in FIG. 10. As such, the magnetic field has an oblique orientation with respect to cell 1 so that the field is substantially at the surface tilt angle of active region surface 201 on upper surface 20. Switching is completed by reapplying the holding potential across cell 1 to maintain the orientational director configuration in the lower asymmetric horizontal state. It should be noted that, in the second switching method, interstate switching may also be accomplished by a counterclockwise rotation of platform 403 about the -x-axis by $(180-2\theta_0)$ degrees from the position shown in FIG. 10.

In both of the switching methods described above, the magnetic field above is utilized to initiate interstate switching by breaking the symmetry of the display cell to bias switching of the orientational directors in favor of one of the asymmetric horizontal states. The electric field established by the holding potential completes the interstate switching cycle and maintains the orientational director configuration in a particular state.

It is advantageous to the operation of the display cell in either asymmetric state for the orientational directors to be inhibited from switching to a vertical configuration. Vertical configuration switching is capable of being prevented by operating variable potential source 50 below the threshold level at which detachment of disclinations occurs. This threshold level is generally found to be on the order of 60 volts.

Although not shown in the Figures, an appropriate combination of linear polarizers and perhaps a fixed retarder plate can be employed to enhance the optical contrast between the asymmetric states.

It will be apparent to a person skilled in the art that various modifications to the details shown and described may be made without departing from the spirit and scope of the invention. For example, interstate switching may be accomplished by employing other symmetry breaking forces. Particularly, a heat pulse can be applied to one surface of the liquid crystal display call to initiate switching. Also, oblique electric fields similar in direction to the oblique magnetic fields (FIGS. 10 and 11) are capable of initiating interstate switching.

What is claimed is:

1. A liquid crystal display cell capable of being switched to either a first state or a second state,
   switching between said first state and said second state being in the absence of movement of a disclination in said display cell,
   the cell comprising first and second substrates disposed in parallel relationship to each other,
   each substrate having a topographically textured inner surface exhibiting a uniform tilt at an acute surface tilt angle from a respective surface normal, and a nematic liquid crystal material having orientational directors disposed between both substrates,
   the cell comprising means for initiating a first change in orientational director configuration by breaking symmetry of the liquid crystal display cell to favor the orientational director configuration wherein an inversion layer of orientational directors is substantially adjacent and parallel to the first substrate, and means connected to each substrate for generating an electric potential through the liquid crystal material to complete and maintain the first change in orientational director configuration so that the orientational directors are configured in the first state.

2. The display cell as defined in claim 1 wherein the surface tilt angle for the topographically textured inner surface on the first substrate is substantially equal to, and of opposite polarity to, the surface tilt angle for the topographically textured inner surface on the second substrate so that both topographically textured inner surfaces form an equal reverse tilt boundary condition.

3. The display cell as defined in claim 2 wherein each topographically textured inner surface has an azimuthal bias with respect to a predetermined reference line, the topographically textured inner surface on the first substrate having an azimuthal bias angle which is in the range of from −90 degrees to +90 degrees, exclusively, and the topographically textured inner surface on the second substrate having an azimuthal bias angle of 0 degrees.

4. The display cell as defined in claim 3 wherein the means for initiating the first change includes means for initiating a second change in orientational director configuration by breaking symmetry of the liquid crystal display cell to favor the orientational configuration wherein an inversion layer of orientational directors is substantially adjacent and parallel to the second substrate, and the means for generating an electric potential further includes means connected to each substrate for generating an electric potential through the liquid crystal material to complete and maintain the second change in orientational director configuration so that the orientational directors are configured in the second state.

5. The display cell as defined in claim 4 wherein the means for initiating the first change is comprised of means for generating a static, homogeneous magnetic field through the liquid crystal material and means for adjusting the position of the magnetic field and the first substrate relative to each other so that the magnetic field is oriented in a first predetermined direction with respect to the first substrate.

6. The display cell as defined in claim 5 wherein the means for initiating the second change is comprised of means for generating a static, homogeneous magnetic field through the liquid crystal material and means for adjusting the position of the magnetic field and the first substrate relative to each other so that the magnetic field is oriented in a second predetermined direction with respect to the first substrate.

* * * * *